April 13, 1926.
E. H. McFARLAND
1,581,007
AIR PRESSURE TESTING DEVICE FOR PNEUMATIC TIRES
Filed March 16, 1925
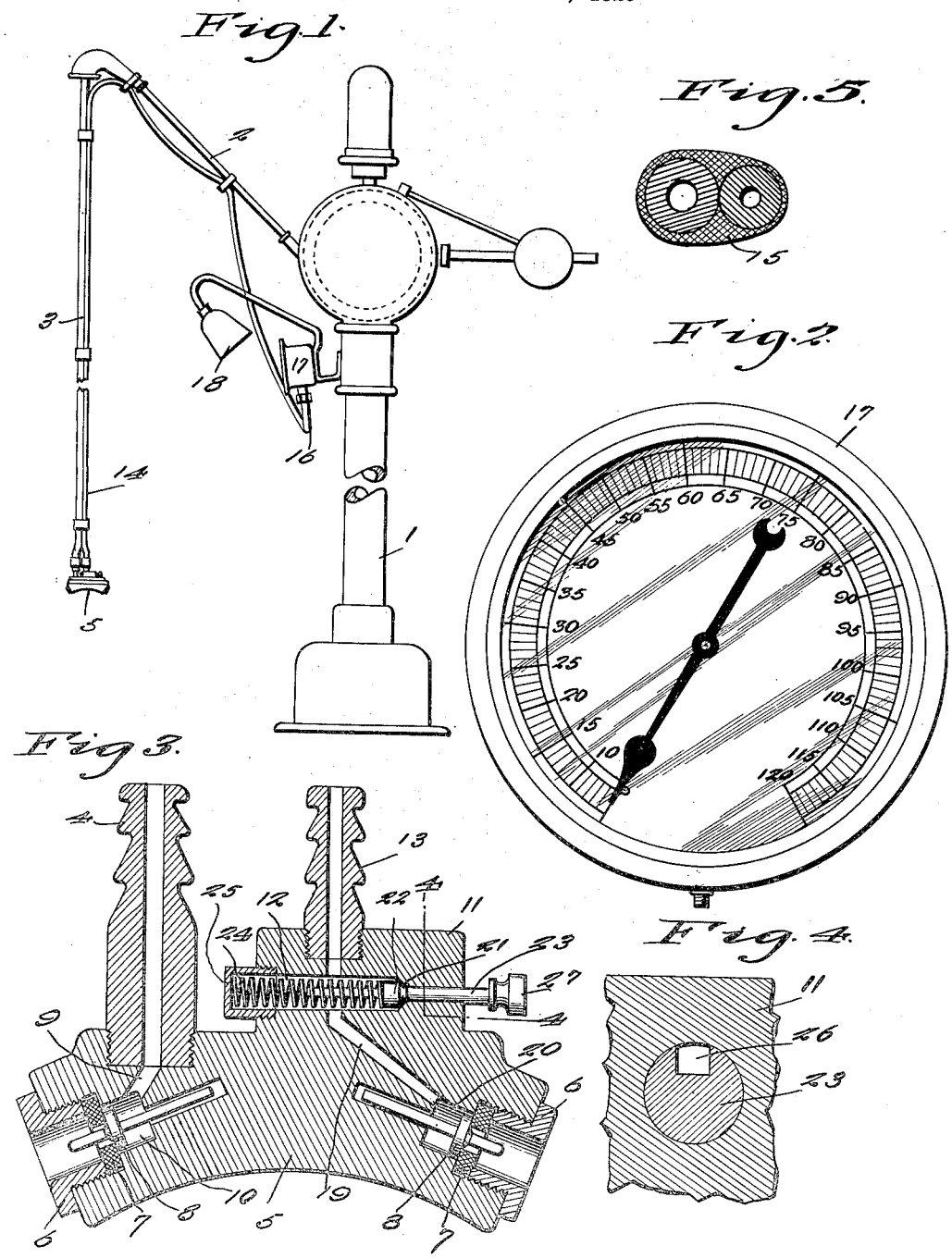
WITNESS:
E. H. McFarland INVENTOR
BY Victor J. Evans
ATTORNEY Patented Apr. 13, 1926.

1,581,007

UNITED STATES PATENT OFFICE.

ERNEST H. McFARLAND, OF LOUISBURG, NORTH CAROLINA, ASSIGNOR OF ONE-HALF TO J. A. HODGES, OF LOUISBURG, NORTH CAROLINA.

AIR-PRESSURE-TESTING DEVICE FOR PNEUMATIC TIRES.

Application filed March 16, 1925. Serial No. 16,070.

*To all whom it may concern:*

Be it known that I, ERNEST H. McFARLAND, a citizen of the United States, residing at Louisburg, in the county of Franklin and State of North Carolina, have invented new and useful Improvements in Air-Pressure-Testing Devices for Pneumatic Tires, of which the following is a specification.

My present invention has reference to a means for visibly indicating the pounds pressure of air in a pneumatic tire, such as is commonly employed on automobiles and like vehicles.

My object is the provision of a means for this purpose which may be associated with the ordinary stand of a tire inflating apparatus such as is commonly employed at gas filling stations, but which is not necessarily restricted in such connection, and wherein a tire may be readily inflated and the precise amount of air pressure in the tire accurately ascertained.

More specifically the improvement resides in a novel construction of nozzle heads provided with spaced passages normally closed by valves which are designed to be unseated by contact with the valve stems of a tire, one of said passages having a pipe connection with a source of air under pressure, the second passage being connected with a pressure gauge whereby, when the valve therein is unseated by the stem of the tire valve, after the tire has been inflated, the pounds pressure of air in the tire will be indicated on the gauge, and in which an over pressure of air in the tire is relieved by the operation of a valve associated with the nozzle head.

A still further object is the provision of a means for this purpose characteristic of simplicity in construction, ease and accuracy in operation and wherein the pressure gauge is located a distance away from the nozzle head to insure the same against injury, and further wherein the said pressure gauge is of a novel construction and is provided with illuminated means for rendering the same perfectly visible at night time.

To the attainment of the foregoing and other objects, which will present themselves as the nature of the invention is better understood, reference is to be had to the drawings which accompany and form part of this application.

In the drawings:

Figure 1 is a side elevation of an ordinary tire inflating stand having my improvement associated therewith.

Figure 2 is a face view of the valve.

Figure 3 is an approximately central longitudinal sectional view through the nozzle head, on an enlarged scale.

Figure 4 is a detail sectional view approximately on the line 4—4 of Figure 3.

Figure 5 is a transverse sectional view through a flexible pipe or hose which may be employed.

In the drawings I have illustrated my improvement in connection with an air stand of the ordinary construction employed in gasoline filling stations, garages and the like, but it is to be understood that the improvement is not to be restricted to use in connection with such stands, as the same may be successfully employed with other tire inflating devices.

Referring now to the drawings in detail the numeral 1 designates an air stand having the usual upwardly and outwardly directed metal pipe 2 to which is connected the flexible hose 3 that ordinarily has secured on its end the usual nozzle head. In the present instance the hose 3 has fixed in its outer end a nipple 4 that is screwed in a nozzle head 5 in accordance with my invention. The nozzle head embodies a somewhat elongated body portion whose ends are provided with round openings in which there are seated flanged gaskets 6. These gaskets contact with the outer faces of washer members 7 that provide seats for valves 8. The valves 8 may be spring influenced, but the valve 8 opposite the nipple 4 is retained seated by the air pressure from the hose 3 that passes through the nipple and communicates with the port 9 leading from the valve chamber 10. The nozzle head has its outer face, opposite the nipple 4, enlarged or thickened, as at 11, and is provided with a longitudinal chamber 12. Screwed in the said portion 11 and communicating with the chamber 12 there is a nipple 13 connected to a flexible pipe or tube 14. As disclosed by Figure 5 of the drawings the tubes 3 and 14 may be enclosed in a fabric casing 15, but this is not necessary or desirable when the usual tube 3 is in good condition.

The tube 14 is arranged in a line with the tube 3 and is secured by brackets or the like to the pipe 2 of the stem 1. The tube also communicates with the pipe member 16 for a pressure gauge 17 that is supported in any desired or preferred manner on the stand 1, adjacent to the upper portion thereof. The pressure gauge has its interior of the usual construction, and its dial graduated and provided with the usual figures to represent pounds pressure of air let in the gauge. Between the figures representing 15 to 45 pounds pressure the graduations on the dial are increased to accurately indicate the low amount of pounds pressure of air needed for inflating balloon tires. Arranged outwardly of and designed to throw its rays of light against the dial of the pressure gauge there is an electric lamp enclosed in a suitable guard 18. The lamp, of course, is only illuminated in the night time.

The nozzle head is provided with a port 19 that communicates with the chamber 20 for the valve 7 at the second end of the nozzle head.

One end of the passage or chamber 12 is opened, and the other end is flared outwardly toward the center thereof to provide a seat 21 for a cone-shaped valve 22. This valve has its stem 23 extended in both directions. The portion of the stem 23 received in the chamber 12 is surrounded by a spring 24 which exerts a pressure between the valve 22 and a hollow cap 25 which is screwed in and closes the open end of the chamber 12. The second portion of the valve stem 23 extends through a suitable opening in the head 5, and this portion of the stem is grooved, as at 26, and has its outer end provided with a head 27.

After the tire is inflated it is, of course, necessary that the pounds pressure of air in the said tire be ascertained. The inflating end of the head is removed from the tire valve, and the second end thereof is arranged on the said tire valve. The tire valve stem unseats the valve 8 so that air from the tire will flow through the valve chamber 20, port 19, and tube 14 into the pressure gauge. The exact amount of pounds pressure in the tire will be registered by the gauge. Should the pounds pressure exceed that required the valve 22 is moved to unseated position, which allows the surplus air to pass through the groove 26 in the valve stem to the atmosphere. As soon as pressure on the head 27 is relieved the spring 24 will force the valve 22 to seated position. In this manner the desired air pressure in the tire may be accurately regulated and recorded.

It is thought from the foregoing description that the advantages and novel features of my invention will be readily apparent.

I desire it to be understood that I may make changes in the construction and in the combination and arrangement of the several parts, provided that such changes fall within the scope of the appended claim.

Having described the invention, I claim:—

A device for the purpose set forth, comprising a head having an air passage therethrough connected to an air gauge and normally closed by a valve which is designed to be unseated by contact with the valve stem of a tire valve, said head having a transverse chamber entering from one of its ends and intersecting the passage, the inner wall of the chamber being depressed to form a valve seat, and the said head, from the center of the said depressed portion having a round opening therethrough, a normally seated spring influenced valve in the chamber, a ported stem therefor extending through the last mentioned opening, and a cap member adjustably secured in the mouth of the chamber and contacting with the spring which influences the valve.

In testimony whereof I affix my signature.

ERNEST H. McFARLAND.